United States Patent
Whitney, Jr. et al.

(10) Patent No.: US 6,596,671 B2
(45) Date of Patent: Jul. 22, 2003

(54) NON-PLATED ALUMINUM BASED BEARING ALLOY WITH PERFORMANCE-ENHANCED INTERLAYER

(75) Inventors: Warren J. Whitney, Jr., Ypsilanti, MI (US); Jeffrey C. Hunter, Ypsilanti, MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 35 days.

(21) Appl. No.: 09/993,227

(22) Filed: Nov. 14, 2001

(65) Prior Publication Data

US 2002/0104876 A1 Aug. 8, 2002

Related U.S. Application Data

(60) Provisional application No. 60/248,931, filed on Nov. 15, 2000.

(51) Int. Cl.$^7$ .................. B32B 15/00; B32B 15/10; C22C 21/00; F16C 33/12
(52) U.S. Cl. .................. 508/103; 428/654; 420/528; 420/548; 384/912; 29/898.12; 29/898.13
(58) Field of Search .................. 508/103; 428/654; 420/528, 548; 384/912; 29/898.12, 898.13

(56) References Cited

U.S. PATENT DOCUMENTS

| | | | |
|---|---|---|---|
| 3,093,885 A | 6/1963 | Morrison et al. | |
| 3,132,418 A | 5/1964 | Fulford | |
| 3,268,369 A | 8/1966 | Haugen | |
| 3,300,836 A | 1/1967 | Slater et al. | |
| 3,300,837 A | 1/1967 | Fisher et al. | |
| 3,300,838 A | 1/1967 | Slater et al. | |
| 3,350,773 A | 11/1967 | Beebe, Jr. et al. | |
| 3,384,950 A | 5/1968 | Ruf | |
| 3,386,161 A | 6/1968 | Ruf | |
| 3,562,884 A | 2/1971 | Webbere | |
| 3,652,344 A | 3/1972 | Kingsbury et al. | |
| 3,997,099 A | 12/1976 | Morisaki | |
| 4,696,867 A | 9/1987 | Eastwood | |
| 4,707,194 A | 11/1987 | Eastwood | |
| 4,789,607 A | 12/1988 | Fujita et al. | |
| 4,996,025 A | 2/1991 | Pratt et al. | |
| 5,053,286 A | 10/1991 | Pratt et al. | |
| 5,075,177 A | 12/1991 | Tanaka et al. | |
| 5,112,416 A | 5/1992 | Tanaka et al. | |
| 5,116,692 A * | 5/1992 | Mori et al. | 428/650 |
| 5,162,100 A * | 11/1992 | Tanaka et al. | 420/530 |
| 5,209,578 A | 5/1993 | Eastham et al. | |
| 5,246,509 A | 9/1993 | Kato et al. | |
| 5,365,664 A | 11/1994 | Whitney, Jr. | |
| 5,434,012 A | 7/1995 | Tanaka et al. | |
| 5,445,896 A * | 8/1995 | Tanaka et al. | 428/647 |
| 5,453,244 A | 9/1995 | Tanaka et al. | |
| 5,525,203 A * | 6/1996 | Rumpf et al. | 205/122 |
| 5,536,587 A | 7/1996 | Whitney, Jr. | |
| 5,545,489 A * | 8/1996 | Tanaka et al. | 428/629 |
| 5,601,371 A | 2/1997 | Koroschetz et al. | |
| 5,817,397 A | 10/1998 | Kamiya et al. | |
| 5,911,513 A | 6/1999 | Tsuji et al. | |
| 5,912,073 A | 6/1999 | Shioda et al. | |
| 5,925,471 A | 7/1999 | Eastham et al. | |
| 6,045,929 A | 4/2000 | Eastham et al. | |
| 6,194,087 B1 | 2/2001 | Huhn et al. | |
| 6,221,515 B1 | 4/2001 | Ramos Junior et al. | |
| 6,273,972 B1 * | 8/2001 | Andler | 428/659 |
| 6,379,819 B1 * | 4/2002 | Steffens et al. | 428/653 |

* cited by examiner

*Primary Examiner*—Jacqueline V. Howard
(74) *Attorney, Agent, or Firm*—Howard & Howard

(57) ABSTRACT

A bi-metal aluminum includes bearing an aluminum-based bearing layer, a steel backing, and an intermediate aluminum-based layer that has a thickness of from 60 to 120 micrometers positioned between the aluminum-based bearing layer and the steel backing. The intermediate layer has a yield strength that is less than that of the aluminum-based bearing layer. The aluminum-based bearing layer has a fine microstructure which imparts a very high fatigue strength. The aluminum bearing layer generally includes 4% to 15% by weight lead or tin, up to 26% by weight silicon and up to 2% by weight of any of the elements magnesium, manganese, nickel, zirconium, zinc, copper, or chromium with the remainder of the bearing layer being aluminum.

27 Claims, 3 Drawing Sheets

NON-PLATED ALUMINUM BASED BEARING ALLOY WITH PERFORMANCE-ENHANCED INTERLAYER

This invention is disclosed in provisional patent application 60/248,931, filed Nov. 15, 2000, whose priority is claimed for this application.

BACKGROUND OF THE INVENTION

1. Technical Field

The present invention relates generally to multi-layer sliding bearings of the type having two or more metal layers bonded to a steel backing strip for use in journaling a shaft or the like.

2. Related Art

Sleeve or sliding bearings for use as main bearings or connecting bearings in internal combustion engines can be divided into two main categories. The categories: (1) bimetal bearings, which consist of a steel backing and a lining alloy on the inside diameter; (2) trimetal bearings, which include a third layer which is typically electro deposited over the lining alloy.

Bimetal bearings typically include an aluminum based lining material placed on the inside diameter of a bearing. This type of bearing offers advantages over trimetal bearings including low cost, good wear resistance, and excellent corrosion resistance. However, for more severe applications, such as in today's higher output engines, there is a need for a bearing with a high fatigue strength and excellent sliding properties which cannot be achieved utilizing bimetal bearings having an aluminum based lining. Typically, trimetal bearings which exhibit a higher fatigue strength than most bimetal bearings must be utilized in the more severe applications.

Several factors known in the art for improving the fatigue strength and performance of bearings include: (a) inclusion of a soft phase, such as tin or lead within the alloy layer to impart seizure resistance to the lining alloy; (b) inclusion of hard particles within the aluminum alloy such as silicon to increase the wear and seizure resistance of the alloy; (c) inclusion of an interlayer between the aluminum bearing alloy and the steel backing to achieve bonding between the lining and the steel when the amount of the soft phase exceeds about 10% by weight.

For example, U.S. Pat. No. 5,112,416 discloses an aluminum-based alloy bearing having an intermediate bonding layer where the hardness is lower than 40% of the aluminum-based bearing alloy in terms of Vickers hardness. While the U.S. Pat. No. 5,112,416 demonstrates a bimetal aluminum bearing, there is no disclosure that such could operate under high load, high fatigue conditions. The highest known fatigue strength shown by any prior bi-metal aluminum bearings is less than 90 mega pascals.

SUMMARY OF THE INVENTION

A sliding bearing constructed according to the invention has a steel backing on which a bi-metal lining is bonded. The lining includes an aluminum-based bearing layer and an intermediate layer of aluminum-based metal disposed between the bearing layer and the steel backing. The composite bearing material exhibits a fatigue strength of at least 90 MPa.

The invention has the advantage of providing a bi-metal aluminum bearing with a fatigue strength at a level normally associated with traditional tri-metal bearings.

The bearing material has the further advantage of providing an aluminum-based bearing layer that has a fine microstructure; thereby improving the fatigue strength of a bearing produced from the composite bearing material.

There is also disclosed a method of manufacturing a composite bearing including the steps of: a) casting an aluminum alloy to produce an aluminum-based bearing layer having silicon particles of less than 4 microns in average diameter dispersed uniformly therein, and a soft phase having a maximum length of 250 microns; b) cladding an aluminum-based intermediate layer material to said aluminum-based bearing layer to produce a bi-metal lining; and c) hot bonding a steel backing layer to said bi-metal lining.

THE DRAWINGS

These and other features and advantages of the present invention will become more readily appreciated when considered in connection with the following detailed description and drawings, wherein.

DETAILED DESCRIPTION

Figure 3:
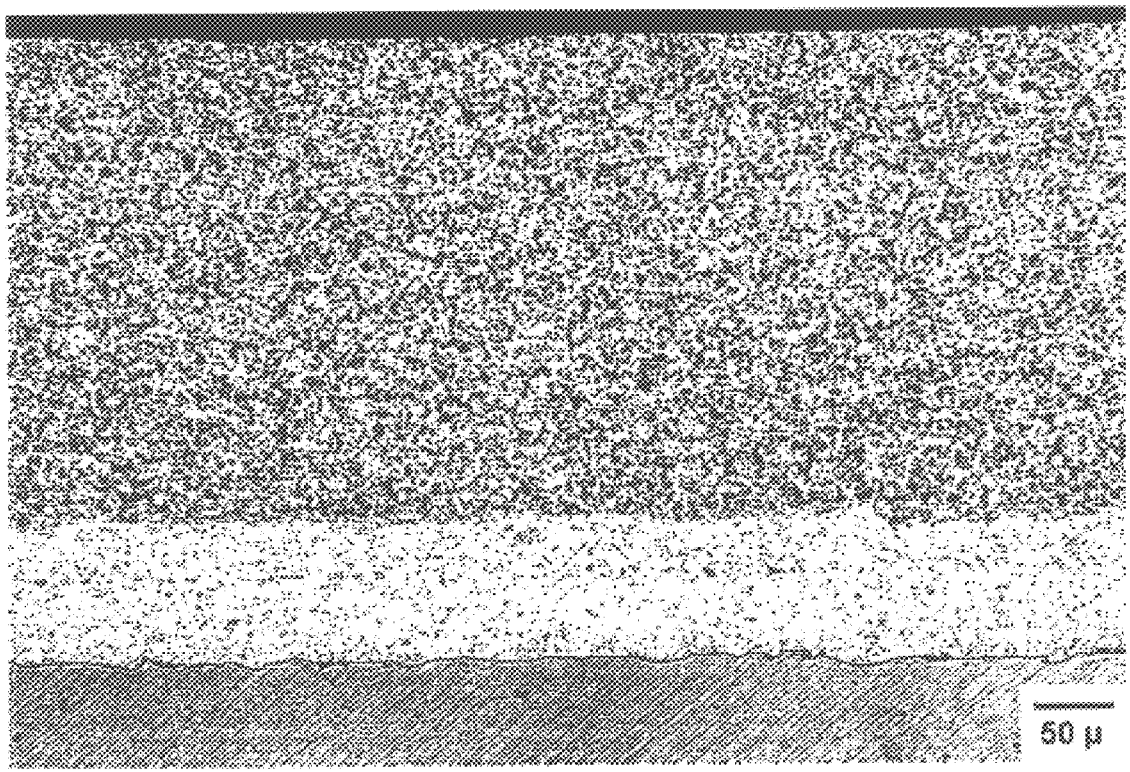
FIG. 3 is a micrograph showing the various layers of the composite bearing material of the present invention.
Figure 4:
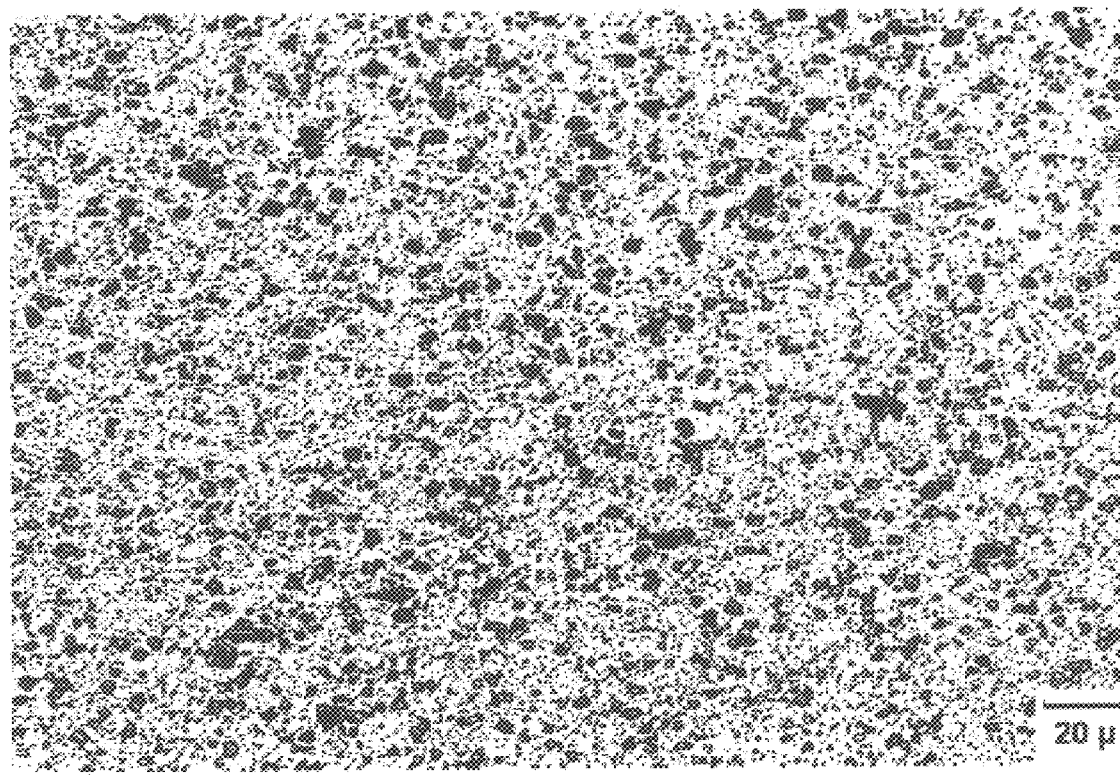
FIG. 4 is a micrograph detailing the silicon particles dispersed within the aluminum bearing alloy of the present invention.

With reference to FIG. 3, there is shown a preferred embodiment of the composite bearing material 5 of the present invention. The composite bearing material 5 includes an aluminum-based bearing layer 10, a steel backing 15, and an intermediate layer 20 positioned between the aluminum layer 10 and the steel backing 15.

The aluminum-based bearing layer 10 preferably has a composition including: 4 to 15 weight percent lead or tin, 2 to 6 weight percent silicon, and up to 2 percent by weight of an element selected from the group consisting of manganese, magnesium, nickel, zirconium, zinc, copper, or chromium; the remainder of the aluminum bearing layer is pure aluminum. In a preferred embodiment, the aluminum-based bearing layer 10 includes 8 weight percent tin, 3 weight percent silicon, 2 weight percent lead, 0.8 weight percent copper, 0.2 weight percent chromium, with the remainder being aluminum. In a second embodiment, the aluminum-based bearing layer includes 6 weight percent tin, 4 weight percent silicon, 0.8 weight percent copper, with the remainder being aluminum.

Regardless of the exact composition of the aluminum-based bearing layer 10, the aluminum-based bearing layer 10 is characterized in that it has a fine microstructure. Aluminum materials having a fine microstructure, as well as methods of their production are disclosed in U.S. Pat. Nos. 5,536,587; 5,365,664; and 5,053,286, which are herein incorporated by reference. A fine microstructure with reference to the constituents of the aluminum-based bearing material 10 is characterized by silicon particles having an average diameter of 4 microns or less uniformly dispersed within an aluminum matrix, as well as soft phase particles of less than 250 microns in length.

In a preferred embodiment, the aluminum-based bearing layer 10 is cast on a twin roll-casting machine, which imparts a fine microstructure to the alloy. The process of the preferred embodiment involves casting a thin strip of aluminum alloy between two water-cooled rolls at a thickness of from 1 to 10 millimeters, and preferably between 4 and 7 millimeters. The rate of heat removal from the aluminum alloy includes a temperature drop from about 700° C. to a temperature below 300° C. in less than 2 seconds, and preferably less than 1 second.

Figure 1:
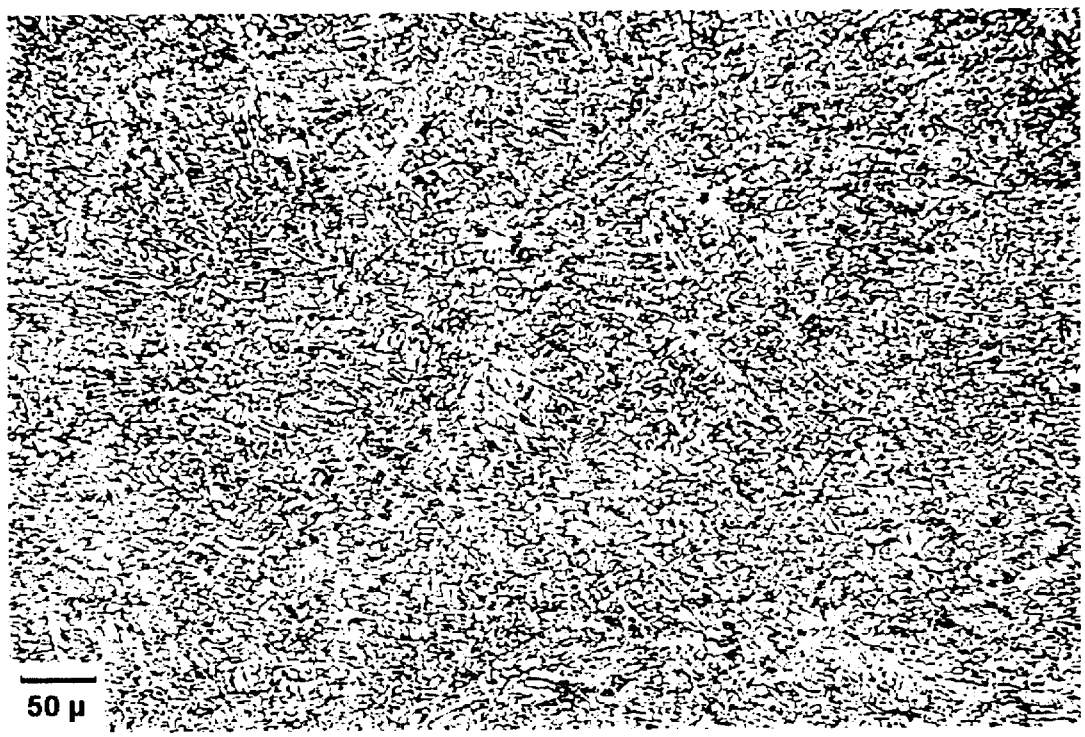
FIG. 1 is a micrograph demonstrating the fine microstructure of the aluminum bearing alloy.
Figure 2:
FIG. 2 is a micrograph demonstrating the fine microstructure of the aluminum bearing alloy of the present invention.

The microstructure obtained when the aluminum-based bearing layer 10 is cast with such a high rate of cooling is shown in FIGS. 1 and 2. The extremely fine microstructure imparts a high strength to the aluminum-based bearing layer 10. The aluminum-based bearing layer 10 has silicon particles 12 that are dispersed within the aluminum matrix 14 and have an average size of less than 4 microns in diameter. Furthermore, the maximum length of the soft phase product particles, i.e., the lead or tin is preferably less than 250 microns in size, and even more preferably, less than about 10 microns or less in length. The fine size of the silicon and other constituents imparts a very high fatigue resistance to the aluminum-based bearing layer 10 of the present invention.

The intermediate layer 20 of the present invention is preferably pure aluminum or an aluminum alloy that has a lower yield strength than the aluminum-based bearing layer 10. The intermediate layer 20 is sized such that it has a thickness of at least 60 micrometers and preferably between 60 and 120 micrometers after being processed.

There is also disclosed a method of manufacturing a composite bearing including the steps of: a) casting an aluminum alloy to produce an aluminum-based bearing layer having silicon particles of less than 4 microns in an average diameter dispersed uniformly therein, and a soft phase having a maximum length of 250 microns; b) cladding an aluminum-based intermediate layer material to said aluminum-based bearing layer to produce a bi-metal lining; and c) hot bonding a steel backing layer to said bi-metal lining.

Figure 5:
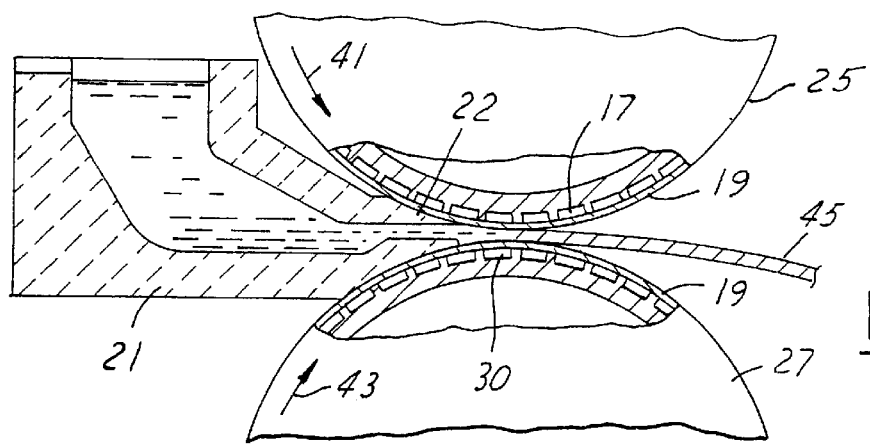
FIG. 5 is a view of an apparatus utilized to produce the aluminum bearing alloy of the present invention.

As referenced above, the aluminum-based bearing material 10 is cast in a water-cooled twin roll casting process that produces a very fine microstructure. The aluminum-based bearing material 10 is cast generally with a thickness of 3 to 7 millimeters and at a rate of 70 to 125 centimeters per minute. In the water-cooled twin roll casting process, the molten alloy is introduced between the rolls at a point above the centerline of the two rolls. With reference to FIG. 5, there is shown an apparatus for casting the aluminum-based bearing layer 10 in accordance with a preferred embodiment of the present invention. The molten aluminum alloy is supplied to a crucible 21 that has a slip-like discharge nozzle 22 located between two rotating rolls 25, 27. Each rotating roll 25, 27 has an array of internal coolant channels or passages 30 located in close proximity to a relatively thin metal shell 32. Each shell 32 is preferably formed of copper or other metal having a high thermal conductivity, whereby the shell 32 material is able to transmit heat from the molten aluminum alloy to the coolant passing through the channels 30. Copper and copper alloys are chosen for their high thermal conductivity; however, steel, brass, aluminum alloys, or other materials may also be used for the shell material 32. The casting surfaces should be generally smooth and symmetrical to maximize uniformity in strip casting. Water is used as a heat transfer medium due to its high heat capacity, low cost and ready availability. The aluminum alloy is rapidly cooled from the molten state to the solid state in a short time period, such as less than one second. The internally cooled rolls 25, 27 are continuously driven in the directions indicated by numerals 41 and 43 such that the freshly cooled roll surfaces are being continuously replenished in crucible 21 to maintain an essentially constant hydrostatic head on the molten material being discharged through the nozzle slit 22. The cooled and solidified alloy emerges from the rolls as a continuous solid strip 45 having a thickness dimension corresponding to the spacing between the opposed roll surfaces. The strip material 45 can be wound on a spool for temporary storage in coil form.

After the aluminum-based bearing layer 10 is cast, the intermediate layer 20 is roll clad to the aluminum bearing layer 10. The intermediate layer 20 is chosen such that its thickness in the finished product will be between 60 and 120 micrometers. As referenced above, a preferred intermediate layer 20 material includes pure aluminum or an aluminum alloy.

After the intermediate layer 20 has been clad to the aluminum-based bearing layer 10, the bi-metal lining is hot bonded to the steel backing 15 according to the process disclosed in U.S. Pat. No. 3,078,563, which is herein incorporated by reference. In this process, the temperature of the components to be bonded is raised significantly above ambient temperature, and the aluminum-based bearing layer 10 is reduced in thickness by approximately 75 percent while the reduction in thickness of the steel backing 15 is essentially zero.

Figure 6:
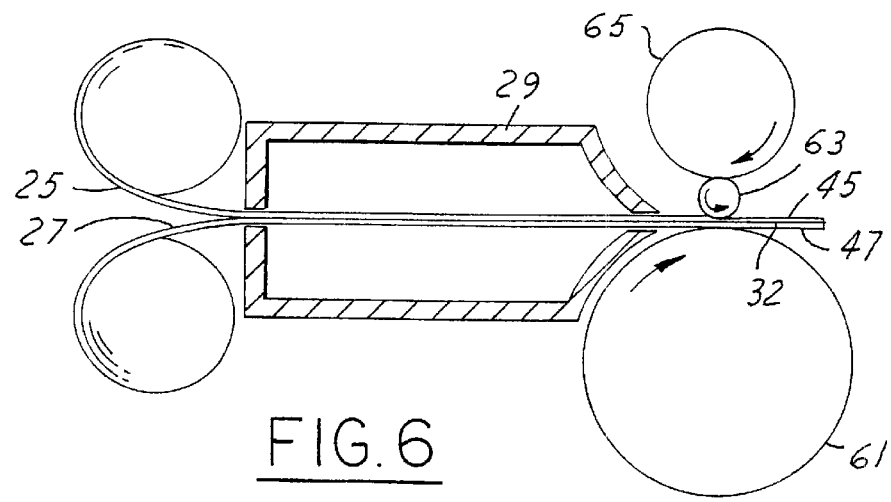
FIG. 6 is a view detailing an apparatus that is used for cladding an aluminum intermediate layer with an aluminum bearing layer of the present invention.

With reference to FIG. 6, there is shown an apparatus utilized in the bonding process. The bi-metal lining strip 45 is mated to a steel strip 47 and passed through a heater. Alternatively, the steel can be heated and the bi-metal strip introduced after the heater where it is heated by the steel. The materials are kept under a non-oxidizing atmosphere to protect the strips from oxidizing while it is being heated. The heated strips 45, 47 are passed through a rolling mill assembly that includes a relatively large diameter lower roll 61 and a smaller diameter center roll 63 which is backed up by a larger diameter upper roll 65. The spacing between the rolls 61 and 63 is less than the combined initial thicknesses of the strips 45, 47, such that the bi-metal strip 45 is compressed and reduced in thickness during the passage of the mating strips through the rolls. The lower roll 61 is powered to provide the force to move the strips 45, 47 through the rolls. The lower roll 61 is preferably at least two times the diameter of the center roll 63 so that the center roll 63 exerts a substantially greater force per unit area on the bi-metal strip 45 than the unit area force exerted by the lower roll 61 on the steel 47. Thus, the bi-metal strip 45 is substantially reduced in thickness whereas the thickness of the steel 47 remains essentially unchanged.

Because the thickness of the steel layer 47 is essentially unchanged, its hardness is not significantly increased, and the emerging composite material 5 is workable and reshapable into desired bearing configurations.

EXAMPLES

Figure 7:
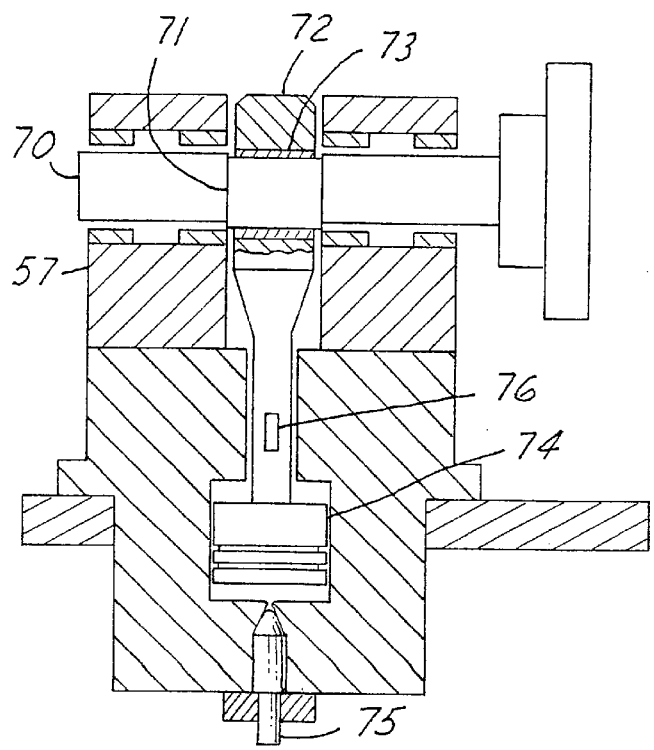
FIG. 7 is a view detailing a testing apparatus for determining the fatigue strength of a bearing.

In a bearing fatigue test widely utilized in the engine bearing industry, the composite material is tested in the form of a bearing in a hydraulic-bearing fatigue test machine, depicted in FIG. 7. The test bearing 73 is carried in a connecting rod 72 on an eccentric portion 71 of a shaft 70 which is rotating at an RPM typically seen by the bearing in actual use. On the other end of the connecting rod 72, there is a piston 74 in a hydraulic cylinder. Reciprocation of the connecting rod 72 and piston 74 is resisted by the oil in the hydraulic cylinder. The degree of resistance and the load on the bearing is determined by an adjustable valve 75 on the cylinder. The load is measured by a strain gage 76 on the connecting rod 72.

Testing begins at an arbitrary load selected by the researchers. The test is run for seven million cycles and the bearing is inspected for fatigue. If fatigue is present, the test is recorded as a failure and the next test is run at a lower load. If fatigue is not present, the test is recorded as a run out and the next test is run at a higher load. After multiple tests, the data is analyzed statistically and an average fatigue load is determined. Results of the test are shown in the tables below. Table 1 identifies two embodiments of the composite bearing material of the present invention. Table 1 includes the relative composition of the bearing material with the numbers following the elements indicating a weight percent of that element, as well as the interlayer thickness in microns, the interlayer type, the bonding method utilized to bond the alloy material to a steel backing, the bearing alloy microstructure, as well as the fatigue strength determined by the tests. For comparison, Table 2 identifies corresponding properties and characteristics of know prior bi-metal aluminum bearings.

TABLE 1

| Bearing Alloy Composition | Interlayer Thickness, Microns | Interlayer Type | Bonding Method | Alloy Microstructure | Fatigue Strength, MPa |
| --- | --- | --- | --- | --- | --- |
| Al Sn8 Si3 Pb2 Cu0.8 Cr0.2 | 100 | Pure Al | Hot | Fine | 100 |
| Al Sn6 Si4 Cu0.8 | 100 | Pure Al | Hot | Fine | 100 |

TABLE 2

| Bearing Alloy Composition | Interlayer Thickness, Microns | Interlayer Type | Bonding Method | Alloy Microstructure | Fatigue Strength, MPa |
| --- | --- | --- | --- | --- | --- |
| Al Sn8 Si3 Pb2 Cu0.8 Cr0.2 | None | N/A | Hot | Fine | 74 |
| Al Sn12 Si3 Pb2 Mn0.2 Sb0.2 | 40–50 | "Reinforced" | Warm | Medium | 87 |
| Al Sn10 Si2 Pb1 Mn0.2 Sb0.2 | <20 | Nickel | Warm | Medium | 68 |
| Al Sn10 Ni2 Mn1 | 35 | Pure Al | Warm | Coarse | 76 |
| Al Sn11 Si3 Pb1 Cu0.9 Cr0.2 | <10 | Nickel | Warm | Medium | 78 |
| Al Sn10 Si3 Pb2 Cu0.9 Cr0.2 | 50 | Pure Al | Warm | Medium | 74 |
| Al Sn11 Si4 Cu1 | 50 | Pure Al | Warm | Coarse | 50 |
| Al Sn11 Si4 Cu2 | <10 | Nickel | Warm | Fine | 72 |
| Al Sn12 Si3 Pb2 Mn0.2 Sb0.2 | 40 | Pure Al | Warm | Medium | 75 |
| An Sn20 Cu1 | 40 | Pure Al | Cold | Coarse | 53 |
| Al Sn8 Si3 Pb2 Cu0.8 Cr0.2 | None | None | Hot | Coarse | 41 |
| Al Sn8 Si3 Pb2 Cu0.8 Cr0.2 | 75 | Pure Al | Hot | Coarse | 57 |

As can be seen from a comparison of the above tables, the composite bearing material of the invention has a fatigue strength of 100 mega pascals which exceeds that of all known prior art bi-metal aluminum materials.

Obviously, many modifications and variations of the present invention are possible in light of the above teachings. it is, therefore, to be understood that within the scope of the appended claims, the invention may be practiced otherwise than as specifically described. The invention is defined by the claims.

What is claimed is:

1. A sliding bearing comprising:
   a steel backing; and
   a bi-metal lining bonded to said steel backing including a bearing layer of aluminum-based metal and an intermediate layer of aluminum-based metal disposed between said steel backing and said bearing layer, said bi-metal aluminum lining having a fatigue strength exceeding 90 MPa.

2. The sliding bearing of claim 1 wherein said fatigue strength is about 100 MPa.

3. The sliding bearing of claim 1 wherein said bearing layer comprises a chill cast aluminum-silicon based alloy.

4. The sliding bearing of claim 1 wherein said bearing layer comprises an alloy of aluminum-lead-silicon.

5. The sliding bearing of claim 1 wherein said bearing layer comprises an alloy of aluminum-tin-silicon.

6. The sliding bearing of claim 1 wherein said bearing layer includes a dispersion of silicon particles having an average particle size less than 4 microns in diameter.

7. The sliding bearing of claim 1 wherein said intermediate layer has a thickness of at least 60 microns.

8. The sliding bearing of claim 7 wherein said thickness of said intermediate layer is between about 60 to 120 microns.

9. The sliding bearing of claim 1 wherein said bearing layer and said intermediate layer each have a yield strength, said yield strength of said intermediate layer being less than said yield strength of said bearing layer.

10. The sliding bearing of claim 1 wherein said bearing layer has a chill cast microstructure and is roll bonded to said intermediate layer.

11. The sliding bearing of claim 1 wherein said bearing layer includes an amount of silicon ranging from about 2 to 6 weight percent and a soft phase of either tin or lead present in an amount of from 4 to 15 weight percent.

12. The sliding bearing of claim 1 wherein said soft phase ranges from about 6 to 10 percent by weight.

13. The sliding bearing of claim 1 further including up to 2 percent by weight of an element selected from the group consisting of: Mn, Mg, Ni, Zr, Zn, Cu, Cr.

14. A composite bearing material comprising:
   an aluminum-based bearing layer;
   a steel backing; and
   an intermediate layer having a thickness of from 60 to 120 micrometers positioned between said aluminum-based bearing layer and said steel backing, said aluminum-based bearing layer having silicon particles of less than 4 microns in average diameter dispersed uniformly therein, and a soft phase having a maximum length of 250 microns.

15. The composite bearing material of claim 14 wherein said soft phase has a length of 10 microns or less.

16. The composite bearing material of claim 15 wherein said soft phase comprises lead or tin.

17. The composite bearing material of claim 15 wherein said aluminum-based bearing layer comprises:

4 to 15 percent by weight soft phase;

2 to 6 percent by weight Si;

up to 2 percent by weight of an element selected from the group consisting of: Mn, Mg, Ni, Zr, Zn, Cu, Cr;

the remainder Al.

18. The composite bearing material of claim 14 wherein said aluminum-based bearing layer comprises:

8 percent by weight Sn;

2 percent by weight Pb;

3 percent by weight Si;

0.8 percent by weight Cu;

0.2 percent by weight Cr;

the remainder Al.

19. The composite bearing material of claim 14 wherein said aluminum-based bearing layer comprises:

6 percent by weight Sn;

4 percent by weight Si;

0.8 percent by weight Cu;

the remainder Al.

20. The composite bearing material of claim 14 wherein said intermediate layer is formed of pure aluminum.

21. The composite bearing material of claim 14 wherein said intermediate layer is formed of an aluminum alloy.

22. The composite bearing material of claim 14 wherein said composite bearing material has a fatigue strength of at least 90 MPa.

23. The composite bearing material of claim 14 wherein said composite bearing material has a fatigue strength of about 100 MPa.

24. A method of manufacturing a composite bearing comprising the steps of:

a) casting an aluminum alloy to produce an aluminum-based bearing layer having silicon particles of less than 4 microns in average diameter dispersed uniformly therein, and a soft phase having a maximum length of 250 microns;

b) cladding an aluminum-based intermediate layer material to said aluminum-based bearing layer to produce a bi-metal lining;

c) hot bonding a steel-backing layer to said bi-metal lining.

25. The method of manufacturing a composite bearing of claim 24 wherein a temperature of said aluminum alloy is reduced from 700° C. to less than 300° C. in less than 2 seconds in said casting step.

26. The method of manufacturing a composite bearing of claim 24 wherein during the hot bonding step a thickness of the aluminum-based bearing layer is reduced by 60 to 80 percent.

27. The method of manufacturing a composite bearing of claim 24 wherein a thickness of said steel backing is unchanged.

* * * * *